(12) United States Patent
Zhou

(10) Patent No.: US 6,899,342 B2
(45) Date of Patent: May 31, 2005

(54) MANUALLY TIGHTENED CHUCK

(76) Inventor: Wenhua Zhou, No. 200 Ji Chang Rd., Lu Qiao District, Taizhou City, Zhejiang Province 318050 (CN)

( * ) Notice: Subject to any disclaimer, the term of this patent is extended or adjusted under 35 U.S.C. 154(b) by 175 days.

(21) Appl. No.: 10/309,555

(22) Filed: Dec. 3, 2002

(65) Prior Publication Data
US 2004/0032094 A1 Feb. 19, 2004

(30) Foreign Application Priority Data
Aug. 16, 2002 (CN) ........................................ 02246777 U

(51) Int. Cl.⁷ ............................................. B23B 31/10
(52) U.S. Cl. ......................................... 279/62; 279/902
(58) Field of Search .............................. 279/60, 61, 62, 279/902

(56) References Cited

U.S. PATENT DOCUMENTS

| | | | | |
|---|---|---|---|---|
| 3,910,589 A | * | 10/1975 | Derbyshire | 279/61 |
| 3,938,817 A | * | 2/1976 | Rohm | 279/61 |
| 4,065,139 A | * | 12/1977 | Rohm | 279/62 |
| 4,395,170 A | * | 7/1983 | Clarey | 408/241 R |
| 5,125,673 A | * | 6/1992 | Huff et al. | 279/60 |
| 5,934,690 A | * | 8/1999 | Lin | 279/62 |
| 6,247,705 B1 | | 6/2001 | Yang et al. | 279/62 |
| 6,428,018 B1 | * | 8/2002 | Aultman et al. | 279/61 |
| 6,540,236 B2 | * | 4/2003 | Aultman et al. | 279/61 |
| 2004/0041357 A1 | | 3/2004 | Zhou | 279/62 |

FOREIGN PATENT DOCUMENTS

| | | | | |
|---|---|---|---|---|
| CN | 2322725 Y | | 6/1999 | |
| EP | 340310 A1 | * | 11/1989 | B23B/31/04 |
| GB | 2030485 A | * | 4/1980 | B23B/31/12 |

* cited by examiner

Primary Examiner—Daniel W. Howell
Assistant Examiner—Michael W. Talbot
(74) Attorney, Agent, or Firm—Ladas & Parry LLP

(57) ABSTRACT

An improved manually tightened chuck, having a hollow chuck body member, provided with three inclined bores along periphery with same interval in chuck body member. A jaw is installed in each inclined bore slidably. A nut is sheathed in the middle of chuck body member, and the nut is interconnected with each jaw through threads. A front sleeve is provided at the front end of the chuck body member, and a rear sleeve is provided at the rear end. The nut is of duplex-half type structure, on its peripheral surface a nut sleeve is sheathed, between the nut sleeve and the nut is of stationary fit, between the front sleeve and the nut sleeve a torque transmission structure is provided, the front end of rear sleeve and the rear end of front sleeve is provided with inter fitted chucking hook, by means of the chucking hook the rear sleeve and the front sleeve are connected with each other. The installation of both front and rear sleeves of the chuck is more convenient, and both front and rear sleeve are more stable after installation, during operation of the chuck no radial swing of both front and rear sleeves is created.

14 Claims, 3 Drawing Sheets

{ US 6,899,342 B2 }

MANUALLY TIGHTENED CHUCK

FIELD OF THE INVENTION

The present invention relates to an improved manually tightened chuck, especially to a manually tightened chuck mounted in machining equipments, for example, a drilling machine tool.

BACKGROUND OF THE INVENTION

In the prior art, a manually tightened chuck generally comprises chuck body member, jaw, nut, front sleeve and rear sleeve. Chinese Patent CN 2322725 authorized on Jun. 9, 1999 discloses a manually tightened chuck, the chuck comprises chuck body member, jaw, nut, front sleeve and rear sleeve. Three jaws are placed respectively in three inclined bores distributed uniformly on the chuck body member. Between the nut and the jaw thread connection is adopted, the rear end of the nut is provided with a thrust bearing, and the rear end of the thrust bearing is provided with a blocking ring, and on the rear end of the chuck body member the rear sleeve is assembled. The nut is of duplex-half structure. The duplex-half structure is combined into a integral through a nut sleeve, between the nut sleeve and the nut is of stationary fit, a key connection is adopted for torque transmission between the front sleeve and the nut sleeve, an annular heave is formed in the inner surface of the front end of front sleeve, the chuck body member at the position corresponding to the heave is provided with a annular groove, the axial orientation of front sleeve is achieved by said heave fitting with said groove. The disadvantages of the manually tightened chuck are: not only the assembling of the front sleeve is inconvenient, but also the structure of front sleeve and rear sleeve is of no fitting and separating, therefore, larger radial swing may be created both in the front sleeve and the rear sleeve during operation of the chuck

SUMMARY OF THE INVENTION

The object of the invention is to overcome the disadvantages of the prior art mentioned above and provides an improved manually tightened chuck. Not only the installing of front sleeve and rear sleeve is made more convenient, but also the front sleeve and the rear sleeve are more stable after installing. Radial swing is not created in either front sleeve or rear sleeve during operation of the chuck.

According to this invention, an improved manually tightened chuck is provided. The chuck comprises a hollow chuck body member, provided with three inclined bores along periphery with same interval in said chuck body member. A jaw is installed in each inclined bore slidably, a nut is sheathed in the middle of said chuck body member, and said nut is interconnected with each said jaw through thread. A front sleeve is provided at the front end of said chuck body member, a rear sleeve is provided with at the rear end, said nut is of duplex-half type structure, on its peripheral surface a nut sleeve is sheathed, between said nut sleeve and said nut is of stationary fit, between said front sleeve and said nut sleeve torque transmission structure is provided, the front end of said rear sleeve and the rear end of said front sleeve is provided with inter fitted chucking hook, by means of said chucking hook said rear sleeve and said front sleeve are connected with each other.

The present invention has the following advantages over the prior art: since the front sleeve and the rear sleeve are connected with each other by means of the chucking hook, it is more convenient to install the front sleeve and the rear sleeve. Also, the front sleeve and the rear sleeve are more stable after installation. There is no radial swing created in either the front or the rear sleeve during operation of the chuck. In the mean time, the structure of the chuck is simplified.

BRIEF DESCRIPTION OF THE DRAWINGS

Further features and advantages of the invention will be explained in detail in conjunction with the embodiment shown by the accompany drawings, wherein.

DETAILED DESCRIPTION OF PREFERRED EMBODIMENTS

Before describing the invention in detail, it is necessary to define related terminologies as follows:

The "front end" in the invention refers to the end of drill held by respective jaw in the improved manually tightened chuck, i.e. the lower end as illustrated in FIGS. 1, 3, 4 and 5.

The "rear end" in the invention refers to the end to be connected with machine tool in the improved manually tightened chuck, for example, a drilling machine tool, i.e. the upper end as illustrated in FIGS. 1, 3, 4 and 5.

Figure 1:
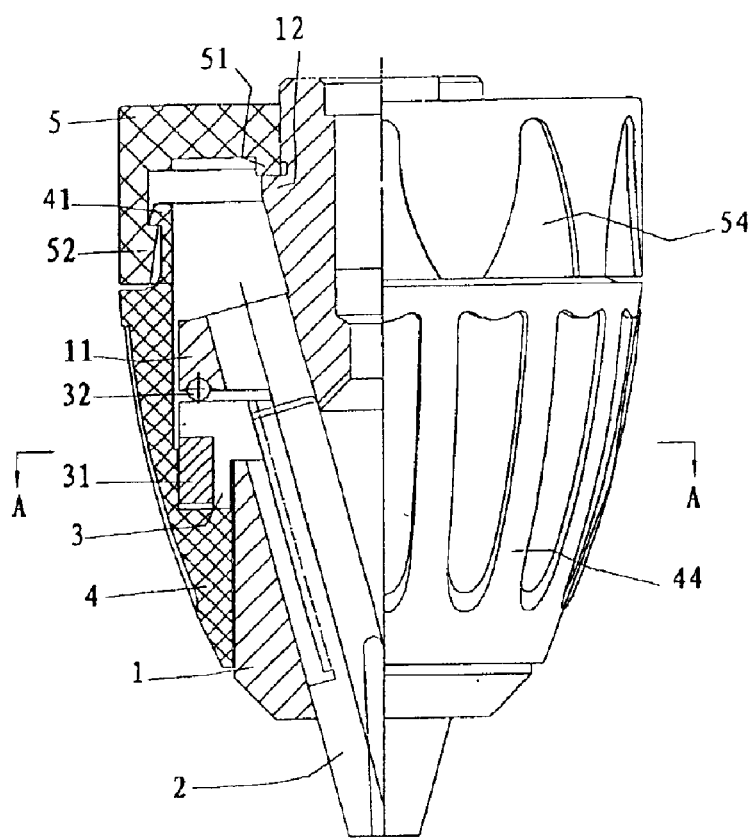
FIG. 1 is a half partial section view of an embodiment of improved manually tightened chuck according to the invention, which shows inner structure and appearance of the chuck.

Referring to FIG. 1, as an embodiment of the invention, an improved manually tightened chuck shown in the figure comprises a hollow chuck body member 1, provided with three inclined bores along periphery with same interval in said chuck body member 1. A jaw 2 is slidably installed in each inclined bore. A nut 3 is sheathed in the middle of said chuck body member 1, and said nut 3 is interconnected with each said jaw 2 through thread. A front sleeve 4 is provided at the front end of said chuck body member 1, and a rear sleeve 5 is provided at the rear end, said nut 3 is of duplex-half type structure, on its peripheral surface a nut sleeve 31 is sheathed. The nut sleeve 31 and the nut 3 have a tight fit.

Figure 2:
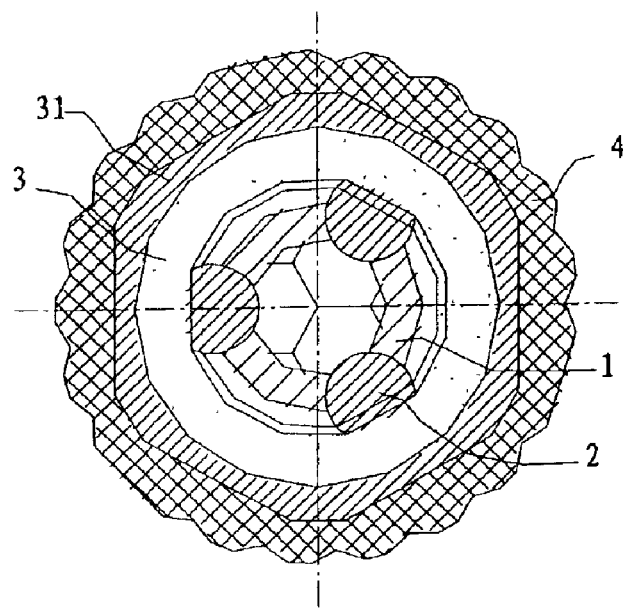
FIG. 2 is a section view along line A—A of FIG. 1, and showing the structure for torque transmission between the front sleeve and the nut sleeve.

As shown in FIG. 2, in the embodiment of the invention, a torque transmission structure is provided between said front sleeve 4 and said nut sleeve 31, the outer profile of said nut sleeve 31 is polygon, polygonal hole fitted with is formed correspondingly in said front sleeve 4. As shown in the figure, the shape of cross-section of said polygon and said polygonal hole is of right hexagon approximately. When rotating front sleeve 4, torque will be transmitted to nut sleeve 31 through above-mentioned structure, and stationary fit is between nut sleeve 31 and nut 3, thereby the rotating of nut 3 is brought. The front end of said rear sleeve 5 and the rear end of said front sleeve 4 is provided with inter fitted chucking hook, by means of chucking hook said rear sleeve 5 and said front sleeve 4 are connected with each other.

In the above mentioned embodiment shown in FIG. 1, said rear sleeve 5 includes a peripheral wall, the rear end of said peripheral wall forms a end wall extended inwardly along radial direction, an inner hole is formed in the end wall, in the lower part of the wall adjacent the inner hole a flange 51 is formed, the lower surface of the flange 51 rests against the top surface of projecting shoulder 12 near the rear end of said chuck body member 1; said shoulder extends outwardly from outer periphery along radial direction; an annular flange 52 extended inwardly along radial direction is formed at the front end of said peripheral wall. The annular flange 52 forms a inner hook. The rear end of said front sleeve (4) contracts inwardly at the position corresponding to said annular flange 52, the end of said contracted part forms an outer hook 41 fitted with said inner hook, by means of the fitting of said outer hook 41 and inner hook, chucking of said front sleeve 4 and rear sleeve 5 could be achieved.

Figure 3:
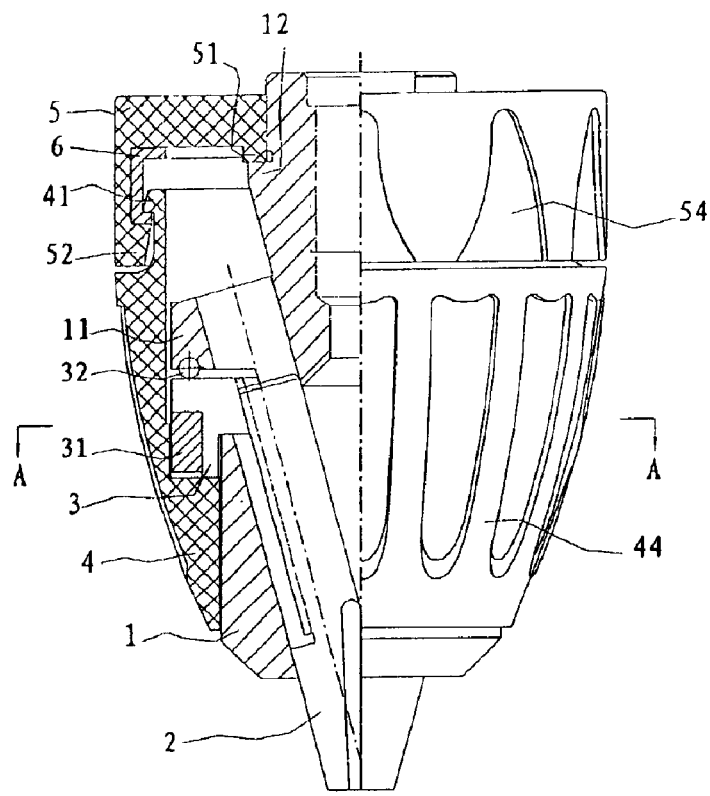
FIG. 3 is a half partial section view of another embodiment of improved manually tightened chuck according to the invention, and showing another inner structure of the chuck.

Referring now to FIG. 3, another embodiment of the invention, an annular flange 52 extended inwardly along radial direction is formed at the front end of said peripheral wall, an embedded piece 6 is embedded between said annular flange 52 and said end wall and forms an inner hook; the rear end of said front sleeve 4 contracts inwardly at the position corresponding to said annular flange 52, the end of said contracted part forms an outer hook 41 fitted with inner hook, the chucking of said front sleeve 4 and rear sleeve 5 could be achieved through the fitting of said outer hook 41 and inner hook.

It is clearly shown in the two embodiments illustrated in FIGS. 1 and 3, the inner surface of the hook head of said inner hook is a conical surface inclined backwardly; the outer surface of the hook head of said outer hook 41 is also a conical surface inclined backwardly, during installation chucking of said outer hook 41 and inner hook could be achieved by using elastic deformation of said front sleeve 4. In the meantime the leading effect of said two conical surfaces facilitates the installation.

Figure 4:
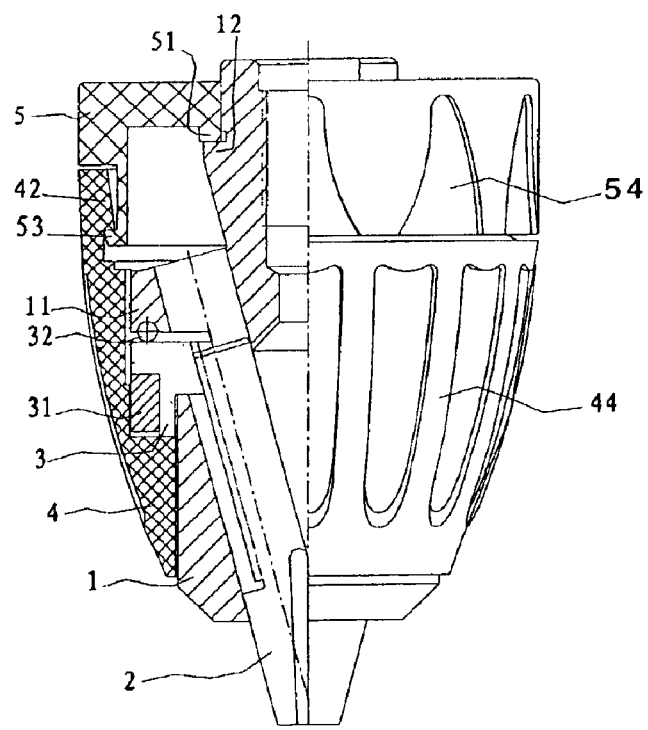
FIG. 4 is a half partial section view of further embodiment of improved manually tightened chuck according to the invention, and showing further inner structure of the chuck.

Referring to FIG. 4, another embodiment of the invention, as shown in the figure, the differences between this embodiment and above mentioned embodiments are: the front end of the peripheral wall of said rear sleeve 5 contracts inwardly, the front end of said contracted part forms an outer hook 53; the ear end of said front sleeve 4 forms an annular flange 42; said annular flange 42 forms an inner hook fitted with said outer hook 53; the chucking of the front sleeve 4 and the rear sleeve 5 is achieved through the fitting of said outer hook 53 and inner hook 62.

Figure 5:
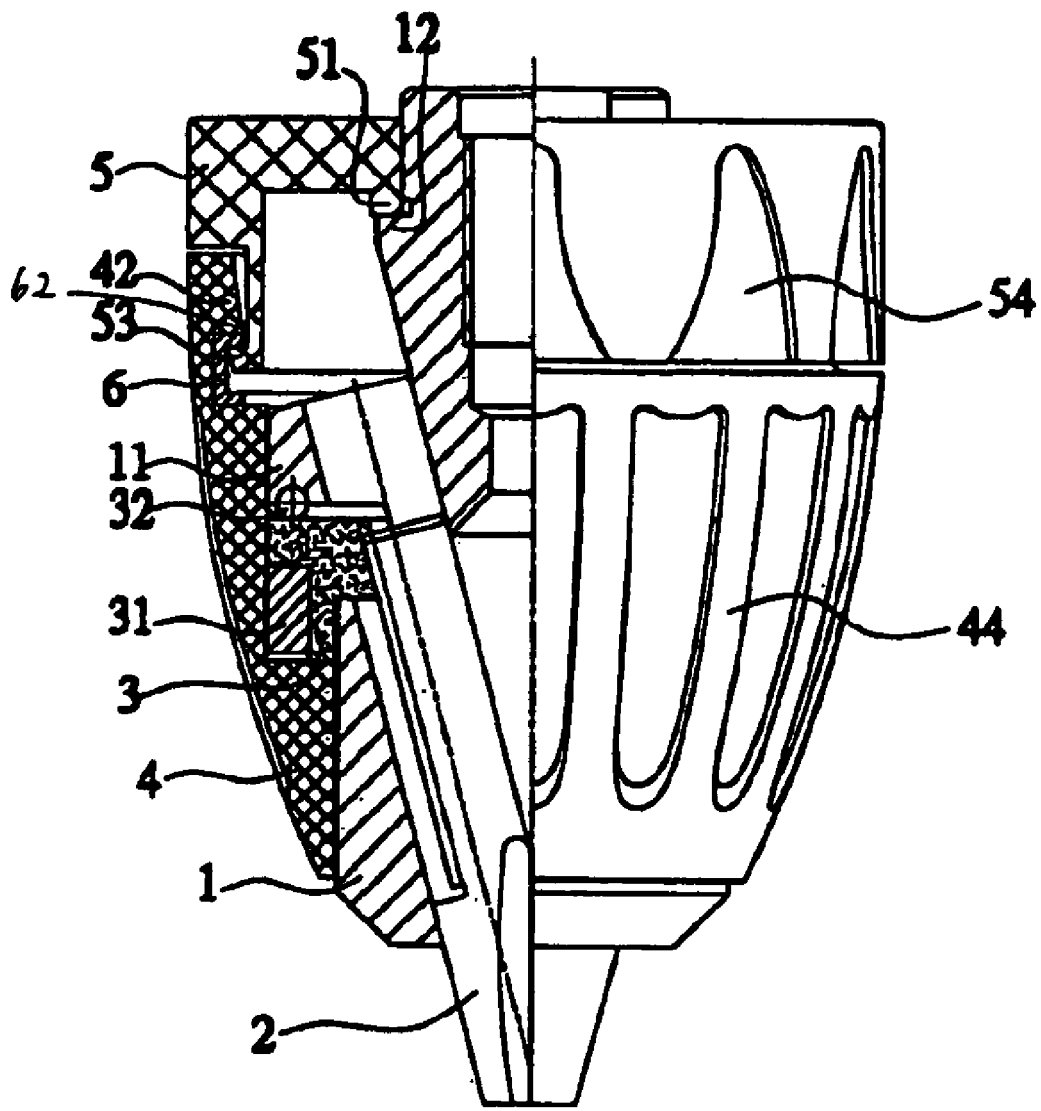
FIG. 5 is a half partial section view of further embodiment of improved manually tightened chuck according to the invention, and showing further inner structure of the chuck.

Referring to FIG. 5, a further embodiment of the invention, the front end of the peripheral wall of said rear sleeve 5 contracts inwardly; the front end of said contracted part forms an outer hook 53; the rear end of said front sleeve 4 forms an annular flange 42; an embedded piece 6 is embedded in the lower part of said annular flange 42; and forms an inner hook fitted with said outer hook 53; the chucking of the front sleeve 4 and the rear sleeve 5 is achieved through the fitting of said outer hook 53 and the inner hook 62.

It is clearly shown in the two embodiments in FIG. 4 and FIG. 5, the outer surface of the hook head of said outer hook 53 is a conical surface inclined forwardly; the inner surface of the hook head of said inner hook is also a conical surface inclined forwardly. During installation the chucking of said outer hook 53 and inner hook 62 is achieved by using elastic deformation of said rear sleeve 5. In the mean time the leading effect of said two conical surfaces facilitates the installation.

As shown in FIGS. 1, 3, 4 and 5, in each of the above-mentioned embodiments, a stepped part 11 extended outwardly along radial direction is formed in the middle part of said chuck body member 1. The stepped part 11 has a surface opposite to the rear end face of said nut 3; a recessing annular orbit machined is on said surface or the rear end face of said nut 3 opposite to said surface; a plurality of rolling balls 32 disposed in said annular orbit; through these rolling balls related rotational movement between said nut 3 and said chuck body member 1 could be achieved. As shown in the figures, said concave annular orbit is formed on the end face of the stepped part of said chuck body member 1.

As shown in FIG. 1 and FIG. 3, in each embodiment given above, the outer peripheral surface of said front sleeve 4 and rear sleeve 5 forms a plurality of convex ridges and concave grooves 44, 54, respectively, for installing and replacing drill by operator.

The operation procedure of the improved manually tightened chuck of the present invention is as follows: firstly, by means of the thread hole in the upper end of the chuck body member, the chuck is fixed to the spindle of a drilling machine tool, not shown, by rotating the front sleeve counter-clockwise (seen from the front end of the chuck); the nut rotates with the front sleeve, so as to cause the three jaws to move upwardly simultaneously to increase a bit receiving open between the jaws. Next, a drill bit is inserted into the aforementioned opening, rotating the front sleeve clockwise, so as to cause the nut to rotate, and causing the three jaws to move downward, and tightened against the drill bit after which drilling could be performed. If the drill bit is to be replaced, the operation procedure is reversed. No further description is necessary.

The embodiments described above are of course subject to many different variations in structure, design and application. Since varying and different embodiments may be made within the scope of the inventive concepts herein taught, and since many modifications may be made in the embodiment herein, it is to be understood that the detailed embodiments provided above are to be interpreted as illustrative only and not in a limiting sense.

What is claimed is:

1. An improved manually tightened chuck, comprising:
   a hollow chuck body member;
   three inclined bores along periphery, provided with same interval in said chuck body member;
   three jaws, slidably installed in each inclined bore respectively;
   a nut, provided in the middle of said chuck body member, said nut interconnected with each said jaw through threads;
   a front sleeve provided at the front end of said chuck body member;
   a rear sleeve sheathed at the rear end of said chuck body member;
   a nut sleeve sheathed on peripheral surface of said nut, said nut being of duplex-half structure and said nut sleeve and said nut having a tight fit; between said front sleeve and said nut sleeve a torque transmission structure being provided; and
   an inter fitted chucking hook disposed at the front end of said rear sleeve and said the rear end of said front sleeve, whereby said rear sleeve and said front sleeve are connected with each other.

2. The improved manually tightened chuck as set forth in claim 1, wherein said rear sleeve includes a peripheral wall, and an end wall extended inwardly along radial direction is formed at the rear end of said peripheral wall, wherein an inner hole is formed in said end wall, a flange is formed at the lower end part of said end wall adjacent said inner hole, and the lower surface of said flange rests against a top surface of a projecting shoulder of the rear end of said chuck body member, said shoulder extending outwardly from outer peripheral surface along radial direction.

3. The improved manually tightened chuck as set forth in claim 2, wherein an annular flange extended inwardly along radial direction is formed at the front end of said peripheral wall, said annular heave forms a inner hook; and the rear end of said front sleeve contracts inwardly at the position corresponding to said annular flange, the end of said contracted part forming an outer hook fitted with said inner hook.

4. The improved manually tightened chuck as set forth in claim 2, wherein an annular flange extended inwardly along radial direction is formed at the front end of said peripheral wall, an embedded piece is embedded between said annular flange and said end wall and forms an inner hook; and the rear end of said front sleeve contracts inwardly at the position corresponding to said annular flange, the end of said contracted part forming an outer hook fitted with inner hook.

5. The improved manually tightened chuck as set forth in claim 3, wherein the inner surface of the hook head of said inner hook is a conical surface inclined backwardly; and the outer surface of the hook head of said outer hook is a conical surface inclined backwardly.

6. The improved manually tightened chuck as set forth in claim 2, wherein the front end of the peripheral wall of said rear sleeve contracts inwardly, the front end of said contracted part forms an outer hook; and the rear end of said front sleeve forms an annular flange, said annular flange forms an inner hook fitted with said outer hook.

7. The improved manually tightened chuck as set forth in claim 2, wherein the front end of the peripheral wall of said rear sleeve contracts inwardly, the front end of said contracted part forms an outer hook; and the rear end of said front sleeve forms an annular flange, an embedded piece is embedded in the lower part of said annular flange, and forms an inner hook fitted with said outer hook.

8. The improved manually tightened chuck as set forth in claim 6, wherein the outer surface of hook head of said outer hook is a conical surface inclined forwardly; and the inner surface of the hook head of said inner hook is also a conical surface inclined forwardly.

9. The improved manually tightened chuck as set forth in claim 1, wherein a stepped part extended outwardly along radial direction is formed in the middle part of said chuck body member, said stepped part has a surface opposite to the rear end face of said nut, a recessing annular orbit machined is on said surface or the rear end face of said nut opposite to said surface, a plurality of rolling balls disposed in said annular orbit.

10. The improved manually tightened chuck as set forth in claim 1, wherein the outer profile of said nut sleeve is of a polygon, a polygonal hole fitted with said outer profile is formed correspondingly in the inner part of said front sleeve.

11. The improved manually tightened chuck as set forth in claim 10, wherein the shapes of cross-section of said polygon and said polygonal hole are right hexagon approximately.

12. The improved manually tightened chuck as set forth in claim 1, wherein the outer peripheral surface of said front sleeve and rear sleeve forms a plurality of convex ridges and concave grooves, respectively.

13. The improved manually tightened chuck as set forth in claim 4, wherein the inner surface of the hook head of said inner hook is a conical surface inclined backwardly; and the outer surface of the hook head of said outer hook is a conical surface inclined backwardly.

14. The improved manually tightened chuck as set forth in claim 7, wherein the outer surface of hook head of said outer hook is a conical surface inclined forwardly; and the inner surface of the hook head of said inner hook is also a conical surface inclined forwardly.

* * * * *